United States Patent [19]

Sekiya et al.

[11] Patent Number: 4,750,115
[45] Date of Patent: Jun. 7, 1988

[54] DATA COMMUNICATION SYSTEM BETWEEN TWO DIFFERENT DATA TRANSMISSION SYSTEMS

[75] Inventors: Makoto Sekiya; Yoshikazu Ikenoue, both of Toyokawa, Japan

[73] Assignee: Minolta Camera Kabushiki Kaisha, Osaka, Japan

[21] Appl. No.: 914,340

[22] Filed: Oct. 20, 1986

[30] Foreign Application Priority Data

Oct. 4, 1985 [JP] Japan .................................. 60-222464

[51] Int. Cl.⁴ ........................ G06F 13/22; G06F 13/24
[52] U.S. Cl. ............................... 364/200; 340/825.52; 370/85
[58] Field of Search ... 364/200 MS File, 900 MS File; 370/85, 96; 340/825.08, 825.5, 825.52

[56] References Cited

U.S. PATENT DOCUMENTS

| | | | |
|---|---|---|---|
| 4,100,533 | 7/1978 | Napolitano et al. | 370/96 X |
| 4,287,567 | 9/1981 | Lumsden | 370/96 |
| 4,603,383 | 7/1986 | Tanaka et al. | |
| 4,622,550 | 11/1986 | O'Connor et al. | 370/85 X |
| 4,639,910 | 1/1987 | Toegel et al. | 370/85 X |
| 4,680,581 | 7/1987 | Kozlik et al. | 370/85 X |

Primary Examiner—Gary V. Harkcom
Assistant Examiner—David L. Clark
Attorney, Agent, or Firm—Price, Gess & Ubell

[57] ABSTRACT

A data communication system for the communication between two different data transmission systems, the SDT system and the RDT system. The SDT system includes a host CPU having an output terminal for repeatedly producing first data in a predetermined sequence of time slots by a number of interruptions taken in each time slot, a bus structure extending from the output terminal of the host CPU for transmitting the data, and a plurality of slave CPUs, each having an input terminal connected to the bus structure for receiving the first data. The RDT system for the data transmission between at least first and second CPUs includes a RAM for storing a command to the second CPU. The first CPU is operative to write the command into the RAM. The first command writing takes place at a first predetermined pulse period in a predetermined sequence of pulses. The second CPU reads the command from the RAM at a second predetermined pulse period. The host CPU in the SDT system is used in common with the first CPU in the RDT system. Also, the sequence of time slots have at least one time slot which is sufficiently long to include the sum of one cycle of the predetermined sequence of pulses and one pulse period for carrying out the data transmission by the second data transmission system within one time slot.

2 Claims, 11 Drawing Sheets

DATA COMMUNICATION SYSTEM BETWEEN TWO DIFFERENT DATA TRANSMISSION SYSTEMS

RELATED APPLICATIONS

Ser. No. 327,019 filed Dec. 3, 1982, now abandoned; Ser. No. 697,478 filed Feb. 1, 1985, now U.S. Pat. No. 4,603,383; and Ser. No. 569,953 filed Jan. 11, 1984, now abandoned and continued as Ser. No. 062,562, filed June 12, 1987.

BACKGROUND OF THE INVENTION

1. Field of the invention

The present invention relates to a data communication system between two different data transmission systems for the two different groups of CPUs.

2. Description of the Prior Art

A highly sophisticated apparatus, such as an electrophotographic copying machine, has a number of mechanical arrangements, such as a paper supplier, an enlargement setting device, a paper size selecting device, paper sorter, etc. These arrangements are operated in a predetermined timed reltionship in a quite complex manner. To accomplish the sophisticated serial operations of the apparatus in a controlled manner, arrangements have their own CPUs (central processing unit) called slave CPUs, which are governed by a central CPU called a host CPU. The data transmission between the host CPU and the number of slave CPUs is carried out, e.g., by a system which is disclosed in a U.S. patent application Ser. No. 569,953 filed Jan. 11, 1984 assigned to the same assignee as the present application. This system is herein referred to as a sequence data transmission system in which the slave CPUs take turns in a predetermined programmed sequence to transmit data from each slave CPU to the host CPU through a common data bus extending in a tree structure from the host CPU to each of the slave CPUs.

Another sophisticated apparatus, such as a word processor, has a group of CPUs which are provided for controlling the components, such as key board, CRT, memory unit and printer. In this type of apparatus, all the CPUs operate individually, i.e., without being governed by a certain CPU. Because the amount of data to be processed in the CPUs in the word processor is much greater than that for the copying machine, the word processor employs a high speed data transmission system, e.g., a data transmission system disclosed in U.S. Pat. No. 4,603,383 also assigned to the same assignee as the present application. This system is herein referred to as a registration data transmission system in which the CPUs take turns to have an access to an externally provided RAM for registering data about an operation of the apparatus. The registered data will be transferred to another CPU when it is that other CPU's turn to have an access to the RAM. The operation data to be transferred may include a request for a direct data transmission from one CPU to another CPU through a data bus connected directly between the CPUs. Such a direct data transmission is necessary for sending a large amount of data, such as the word data for the word processing.

A problem arises when these two apparatuses having different data transmission systems are to be assembled together with the need of a mutual data exchange. Such an assembly is, for example, when the word processor employing a laser printer is to be assembled together with a copying machine. In this case, there will be a desire to use, for example, the paper supplier and/or the paper sorter provided in the copying machine for efficiently making prints by the laser printer for the word processor. In this case, the problem is how to communicate operation data from one data transmission system to another data transmission system.

SUMMARY OF THE INVENTION

The present invention has been developed with a view to substantially solving the above described problem and has for its essential object to provide a data communication system which can enable the data exchange between the two different data transmission systems.

It is also an essential object of the present invention to provide a data communication system of the above described type which can be accomplished with a minor change in each data transmission system.

In accomplishing these and other objects, a data communication system according to the present invention is provided to communicate between two different data transmission systems which are the SDT system and the RDT system.

The SDT system comprises a host CPU having an output terminal for repeatedly producing first data in a predetermined sequence of time slots by at least one interruption taken in each time slot, a bus structure having at least one first-type of line extending from the output terminal of the host CPU for transmitting the data, and the a plurality of slave CPUs, each having an input terminal connected to the first-type line of the bus structure for receiving the first data.

The RDT system for the data transmission between at least first and second CPUs comprises a RAM for storing a command table and an interruption table, in which the command table includes a storage location for a first command to the second CPU. The first CPU is operative to write the first command into the storage location in the RAM and to subsequently write a first code, indicating an interruption of the second CPU, to a location in the interruption table. The first command writing and the first code writing take place at a first predetermined pulse period in a predetermined sequence of pulses. A decoder is provided to generate, responsive to the writing of the first code into the RAM, a first interruption signal to the second CPU. The second CPU reads, in response to the first interruption signal, the first command from the RAM at a second predetermined pulse period.

According to the present invention, the host CPU in the first data transmission system is used in common with the first CPU in the second data transmission system.

Also, according to the present invention, the sequence of time slots have at least one time slot which is sufficiently long to include the sum of one cycle of the predetermined sequence of pulses and one pulse period for carrying out the data transmission by the second data transmission system within one time slot.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENT

The data communication system, according to the present invention, for the data communication between the sequence data transmission system and the registration data transmission system will be described under the following subtitles.

A. Structure of the data communication system
B. Sequence data transmission (SDT) system
C. Registration data transmission (RDT) system
D. Conditions to combine two data transmission systems
E. Operation of the data communication system A. Structure of the data communication system Although the data communication system according to the present invention is applicable to any sophisticated apparatus employing the sequence data transmission system and the registration data transmission system, the description hereinbelow is given in connection with a copying machine, employing the sequence data transmission system, combined with a word processor, employing the registration data transmission system.

Figure 1:
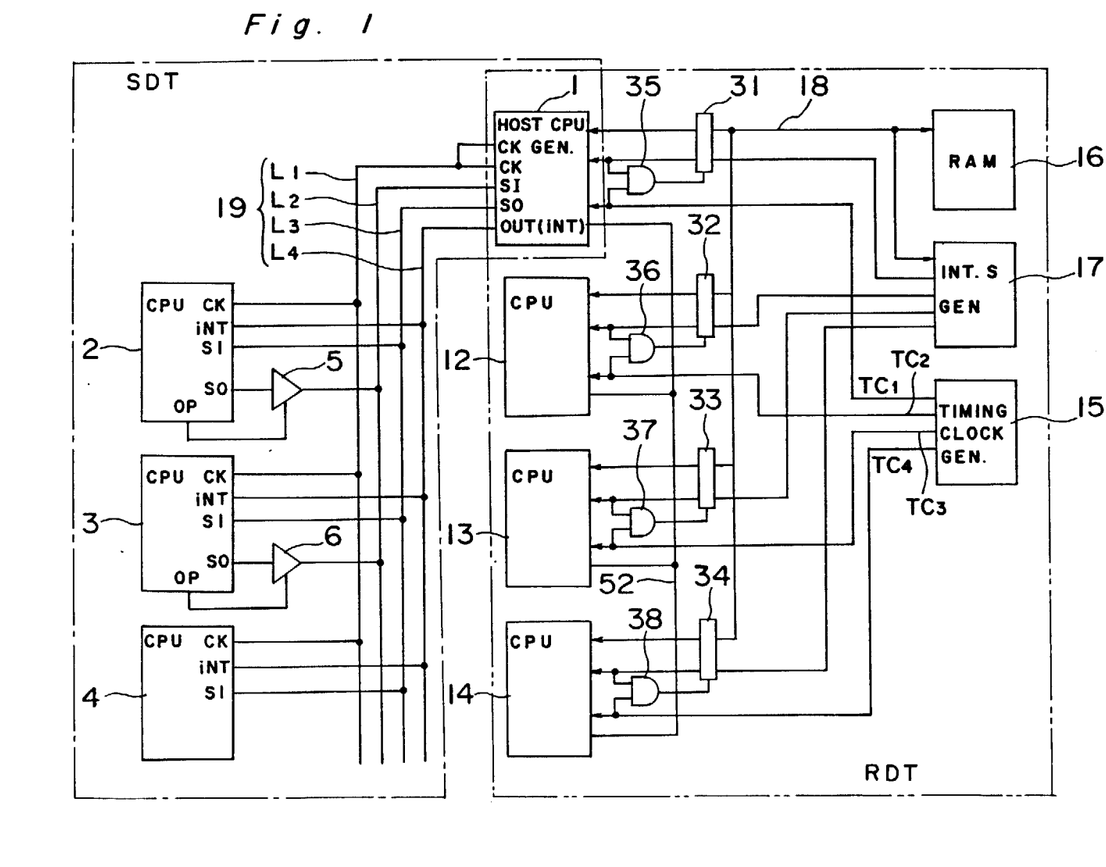
FIG. 1 is a circuit diagram showing a data communication system according to the present invention.

Referring to FIG. 1, the data communication system according to the present invention is provided for the data communication between the sequence data transmission system indicated by a reference character SDT and the registration data transmission system indicated by a reference character RDT.

In the SDT system, a plurality of CPUs 1, 2, 3 and 4, each used for the microcomputer, are provided. Of all the CPUs, one CPU 1 serves as a host CPU which governs the operation of other slave CPUs 2, 3 and 4. The SDT system is used for the data transmission among CPUs 1, 2, 3 and 4.

In the RDT system, a plurality of CPUs 1, 12, 13 and 14, each used for the microcomputer, are provided. In the RDT system, the CPUs are not divided into host and slave CPUs. In other words, each CPU in the RDT system operates under its own control. The RDT system is used for the data transmission among CPUs 1, 12, 13 and 14.

According to the present invention, the host CPU 1 of the SDT system is used in common with one of the CPUs used in the RDT system, or one of the CPUs in the RDT system is used in common with the host CPU 1 of the SDT.

B. Sequence data transmission (SDT) system

Figure 2:
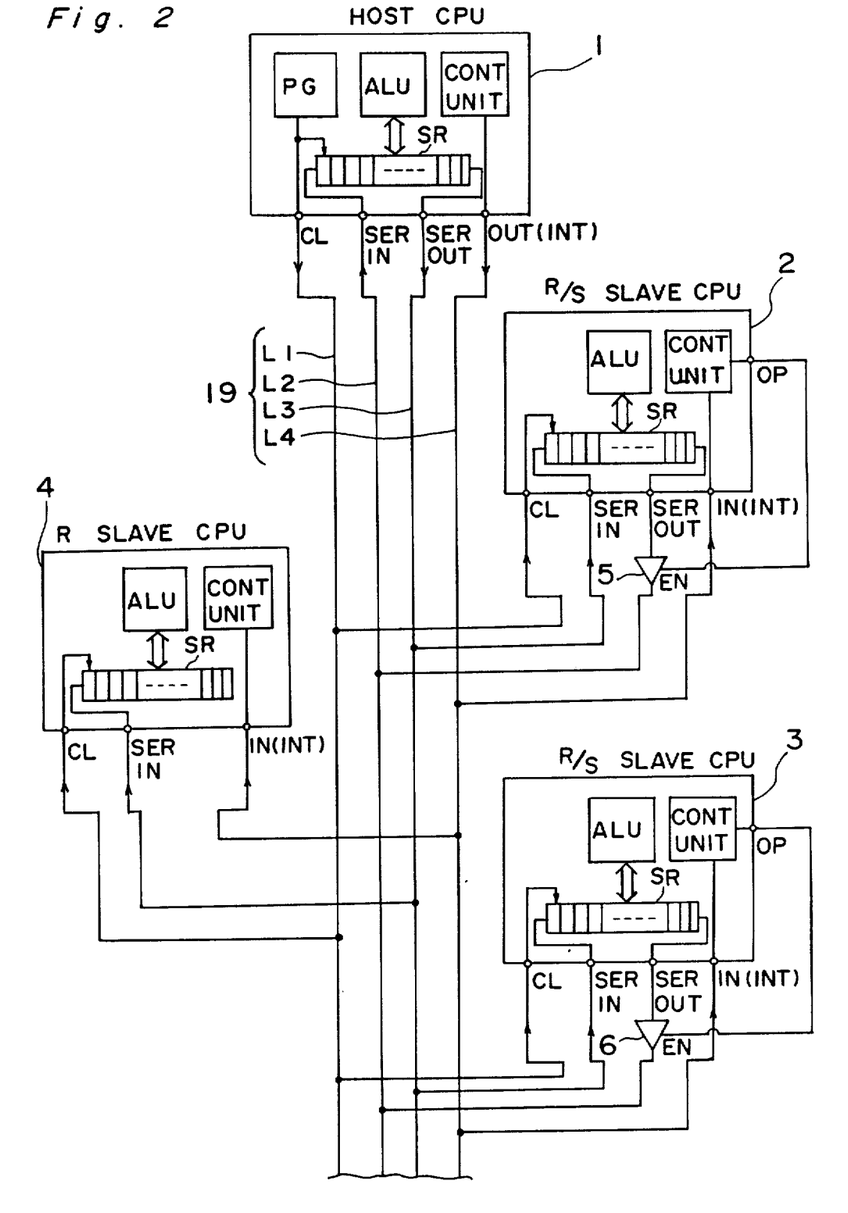
FIG. 2 is a circuit diagram showing a connection between a CPU of the host microcomputer and each of CPUs of slave microcomputers for the SDT system.

Referring to FIG. 2, the sequence data transmission (SDT) system is shown, which comprises a data bus structure 19 having lines L1, L2, L3 and L4. Host CPU 1 is connected to each of slave CPUs 2, 3 and 4 through data bus structure 19. As shown in FIG. 2, lines L1, L2, L3 and L4 are illustrated with arrows pointing the directions of the data flow. It is understood from the arrows that slave CPUs 2 and 3 are capable of both receiving and sending data and, therefore, they are referred to as R/S slave CPUs, and that the CPU 4 is capable of only receiving data and, therefore, it is referred to as a R slave CPU. In FIGS. 1 and 2, there are only two R/S slave CPUs and one R slave CPU are shown, but it is possible to provide more of these slave CPUs.

Still referring to FIG. 2, host CPU 1 has four terminals: clock terminal CL; serial-in terminal SER IN; serial-out terminal SER OUT; and interrupt pulse producing terminal OUT(INT), which four terminals are connected respectively to lines L1, L2, L3 and L4. The host CPU includes a clock pulse generator PG for producing clock pulses which are applied to the clock terminal CL.

It is to be noted that clock pulse generator PG may be located externally of the host CPU. In this case, the host CPU may be further provided with an input terminal for receiving such clock pulses.

The host CPU 1 further includes an arithmetic-logic unit ALU, a control unit CONT UNIT, and a 16-bit shift register SR. Arithmetic-logic unit ALU is connected to shift register SR through a bidirectional data path. An input end of the shift register SR is connected to serial-in terminal SER IN, and an output end thereof is connected to serial-out terminal SER OUT. Furthermore, shift register SR is connected to pulse generator PG, and is driven by the clock pulse. Control unit CONT UNIT produces interrupt pulses which are transmitted through interrupt pulse producing terminal OUT(INT).

The R/S slave CPU 2 has clock terminal CL, interrupt pulse receiving terminal IN(INT), serial-in terminal SER I and serial-out terminal SER OUT. The clock terminal CL, interrupt pulse receiving terminal IN(INT) and serial-in terminal SER IN are directly connected to lines L1, L4 and L3, respectively, whereas serial-out terminal SER OUT is connected to line L2 through a gate 5. The R/S slave CPU 2 further has an OP terminal which is connected to an enable terminal EN of gate 5. Like host CPU 1, R/S slave CPU 2 includes an arithmetic-logic unit ALU, a control unit CONT UNIT, and a 16-bit shift register SR. Arithmetic-logic unit ALU is connected to shift register SR through a bidirectional data path. An input end of the shift register SR is connected to serial-in terminal SER IN, and an output end thereof is connected to serial-out terminal SER OUT. Furthermore, shift register SR is connected to clock terminal CL, and is driven in a synchronized manner with the shift register SR in the host CPU. Control unit CONT UNIT is connected to the interruption pulse receiving terminal IN(INT) and also to the OP terminal. Another R/S slave CPU 3 has the same structure as R/S slave CPU 2 with gate 6 connected to the serial-out terminal SER OUR.

The R slave CPU 4 differs from the R/S slave CPU in that it does not have the serial-out terminal SER OUT, so that the shaft register SR in the R slave CPU has no ability of sending out data serially. Therefore, no line is connected to line L2. Other structures in the R slave CPU 4 are the same as the R/S.

Next, words produced from host CPU are explained in detail.

Figure 3:
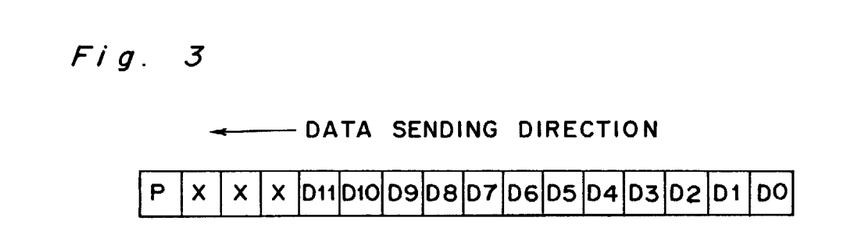
FIG. 3 is a diagrammatic view showing a data block produced from the host CPU in one cycle operation.

The host CPU 1 is previously programmed to sequentially produce from the arithmetic-logic unit ALU a number of different 16-bit long data blocks, an example of which is shown in FIG. 3. The most significant bit of each data block is a parity bit for checking data error. The next 3 most significant bits are for a sequence code representing a particular R/S slave CPU. According to the embodiment, the sequence code changes as follows, "000", "001", "010", "011", "$\phi$", "101" and "110". The purpose of employing the sequence code will be described later.

The remaining 12 bits of the data block, indicated as $D_{11}$ to $D_0$, are for the specific data for controlling the copying machine. For example, a bit $D_{11}$ of the data block carries "YES" or "NO" data whether the printing device is in a condition ready to start a new printing operation. A next bit $D_{10}$ carries "YES" or "NO" data whether the sorter device is in a condition ready to sort copied papers. The remaining 10 bits $D_9$–$D_0$ may be used altogethere to indicate a rate of enlargement or reduction.

Next, the operation of the sequence data transmission system is described. First, an operation for transmitting the 16-bit long data blocks from the host CPU to each of R/S slave CPUs and R slave CPUs (generally referred to as slave CPUs) is described with reference to FIGS. 4a and 4b.

The host CPU 1 produces from its interrupt pulse producing terminal OUT(INT) interrupt pulses which divides one period T1 into twenty time slots S1–S20, in which time slots S1–S16 are used for the sequence data transmission (SDT) system. One cycle operation for the SDT system is carried out in each time slot. By the step-up or step-down of each interruption pulse INT, a timer provided in CPU 1 starts to count a predetermined time t11 (FIG. 4b). During the count of the predetermined time t11, shift register SR in the host CPU 1 is loaded with the 16-bit long data block. Then, when time t11 is counted, an interruption in the CPU starts to serially transmit the first half (8 bit) of the 16-bit long data block through line L3 from the shift register SR in host CPU 1 to the shift registers SR in slave CPUs 2, 3, and 4. The first half of the 16-bit long data is transmitted bit-by-bit in response to eight clock pulses during a time t12.

When the first half of the 16-bit long data is transmitted, another interruption starts so as to count a predetermined time t13 by the timer provided in the CPU 1. During the count of time t13, no data transmission through data bus 19 is carried out, but data processing is carried out in each CPU.

After counting the time t13, yet another interruption starts so as to transmit the second half of the 16-bit long data in a manner similar to the first half of the same. Thus, the second half of the 16-bit long data is transmitted during a time t14 in response to eight clock pulses.

When the time t14 is over, a further interruption starts so as to read the 16-bit long data in register SR in each of slave CPUs 2, 3 and 4 into the respective arithmetic-logic unit ALU.

In this manner one 16-bit long data is transferred from the host CPU to all the slave CPUs in one time slot, such as in S3, with five interruptions effected at the start of each periods t11, t12, t13, t14 and t15. In another time slot, another 16-bit long data is transferred from the host CPU to all the slave CPUs.

Next, an operation for transmitting the 16-bit long data blocks in the opposite direction, i.e., from each slave CPU to the host CPU is described.

As apparent from the above description, all the R/S slave CPUs receive the 16-bit long data block with a sequence code "000" at the same time, such as in the time slot S1, and in the next sequence they receive a next data block with a sequence code "001" at the same time, such as in the time slot S2. In this manner, all the R/S slave CPUs receive different data blocks sequentially and in a repeated manner. Therefore, each R/S slave CPU can predict the sequence code of the data block that comes next. For example, when the R/S slave CPU is receiving a data block with a sequence code "001", it is understood that the R/S slave CPU will receive a data block with a sequence code "010" in the next time slot.

Each R/S slave CPU is designated with at least one sequence code. For example, according to the embodiment described herein, R/S slave CPU 2 is designated with two sequence codes "000" and "001", and another R/S slave CPU 3 is designated with one sequence code, "010". No sequence code is given to the R slave CPU 4, since it does not produce any message to be transferred, but it only receives data.

When it is supposed that a 16-bit long data block with a sequence code "001" is now being produced from the host CPU 1, all the slave CPUs receive sequence code "001" followed by the specific data in bits $D_{11}$–$D_0$. In each R/S slave CPU, the detected sequence code "001" is added with "1" to find the sequence code of the data block which will be delivered in the next sequence. For example, in the above case, each R/S slave CPU finds that the next data block will have a sequence code of "010". Then, each R/S slave CPU compares the sequence code "010" of the data block that will be delivered in the next sequence, and the sequence code which is given to each R/S slave CPU. If these two codes match in one R/S slave CPU, that R/S slave CPU will know that the next sequence is its turn to send data from that R/S slave CPU to the host CPU. Thus, that R/S slave CPU deposits its data to be sent in its shift register SR, and produces from the output OP an enable signal to the ENABLE terminal of the gate coupled to that R/S slave CPU, making it ready for the data sending.

For example, in the above given case, upon receipt of the data block with a sequence code "001", R/S slave CPU 3 designated with a sequence code "010" finds that it is its turn to send data to host CPU 1 in the next time slot S3. Accordingly, immediately after the R/S slave CPU 2 reads in the data block with the sequence code "001", R/S slave CPU 2 starts to produce an enable signal from its output OP and, about the same time, it deposits in its shift register SR a 16-bit long data block, which should be transferred to the host CPU 1.

Then, in the next time slot, e.g., S3, the data block with a sequence code "010" is transferred from the host CPU to every one of the slave CPUs and, at the same time, a 16-bit long data block is transferred from the R/S slave CPU 2 to host CPU 1. Even in this case, five interruptions are effected at the start of each periods t11, t12, t13, t14 and t15. In this manner, the mutual transmission of data between the host CPU and R/S slave CPU is carried out.

C. Registration data transmission (RDT) system

Referring again to FIG. 1, the registration data transmission (RDT) system is shown which comprises a bit structure 52 which is directly connected to each of CPUs 1, 12, 13 and 14. A RAM 16 is provided which is connected to CPUs 1, 12, 13 and 14 through high speed bus buffers 31, 32, 33 and 34, respectively. An interruption signal generator 17 is so connected as to receive signal from CPU 1 and to provide interruption signals to CPUs 1, 12, 13 and 14. Interruption signal generator 17 is, for example, a decoder and generates an output corresponding to an input having a code pattern. Accordingly, interruption signal generator 17 receives an input of address information and timing clock (described below) and generates an output corresponding to the address information. When a statement is written at a predetermined address of in RAM 16, the same address signal is fed to the interruption signal generator 17 so as to generate an interruption signal corresponding to the predetermined signal.

A timing clock generator 15 is provided so as to sequentially produce timing clocks TC1, TC2, TC3 and TC4 (FIG. 5) to CPUs 1, 12, 13 and 14, respectively, for sharing access time to RAM 16. Upon detection of the leading edge of the timing clock TC1, CPU 1 starts to have an access to RAM 16 until the trailing edge of the timing clock TC1 is detected. Similarly, CPUs 12, 13 and 14 have an access to RAM 16 during the pulse period of pulses TC2, TC3 and TC4, respectively.

Figure 6:
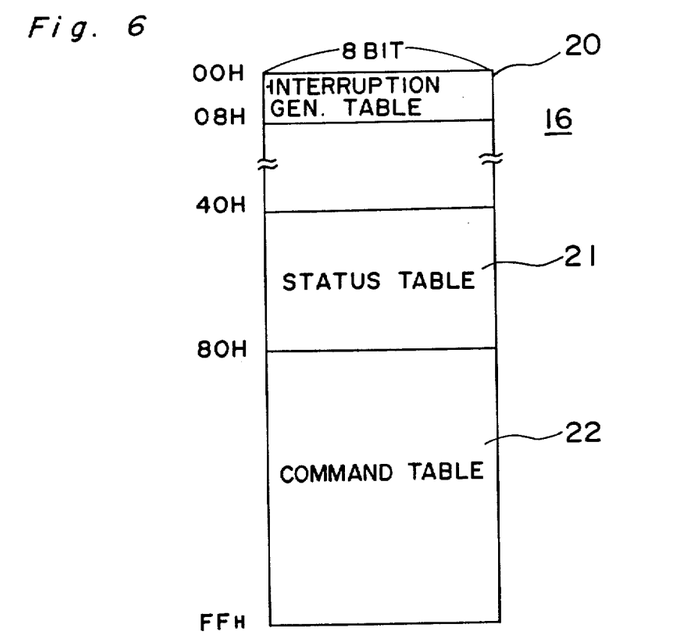
FIG. 6 is a configuration of a RAM used in the RDT system.

RAM 16 is provided so as to be used in common by the CPUs 1, 12, 13 and 14 and has areas for an interruption generation table 20 carrying data of interruptions for the CPUs, a status table 21 carrying data of operational statuses of each CPU and a command table 22 carrying operational commands for each CPU, as shown in FIG. 6.

The interruption generation table 20 has addresses 00H to 08H (H indicates a hexadecimal numbering system) in which particular addresses are given for particular CPU.

Figure 7:
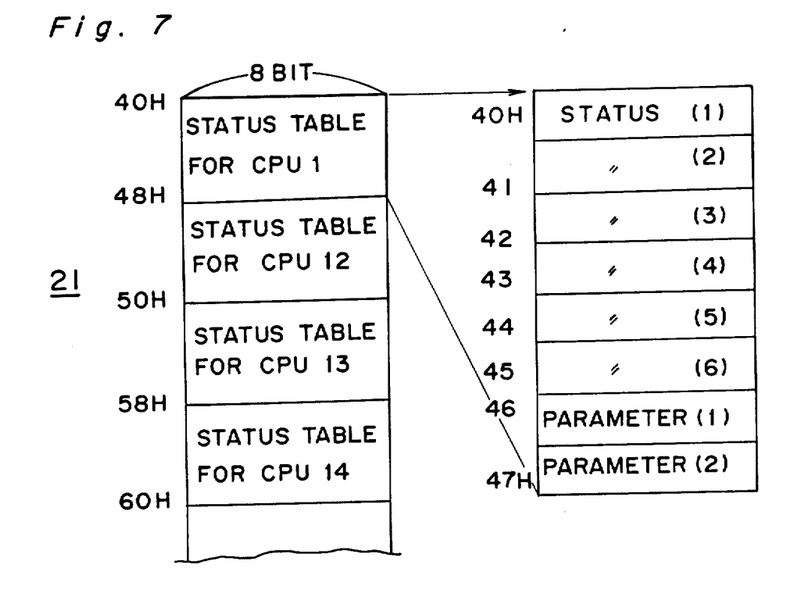
FIG. 7 is a detailed layout of a status table in the RAM.

Referring to FIG. 7, addresses 40H to 60H in RAM 16 are allotted for the status table 21. Particularly, addresses 40H to 47H are for the use of CPU 1, in which 40H to 45H are used for writing statuses (1) to (6) of CPU1, and 46H and 47H are used for writing parameters (1) and (2) to be used in CPU 1. For example, at 40H, a statement indicating whether CPU 1 is ready to read and write RAM in the pulse duration of timing clock TC1, or whether it is busy doing some operation so that it can not read and write ROM at that period, is stored.

Figure 8:
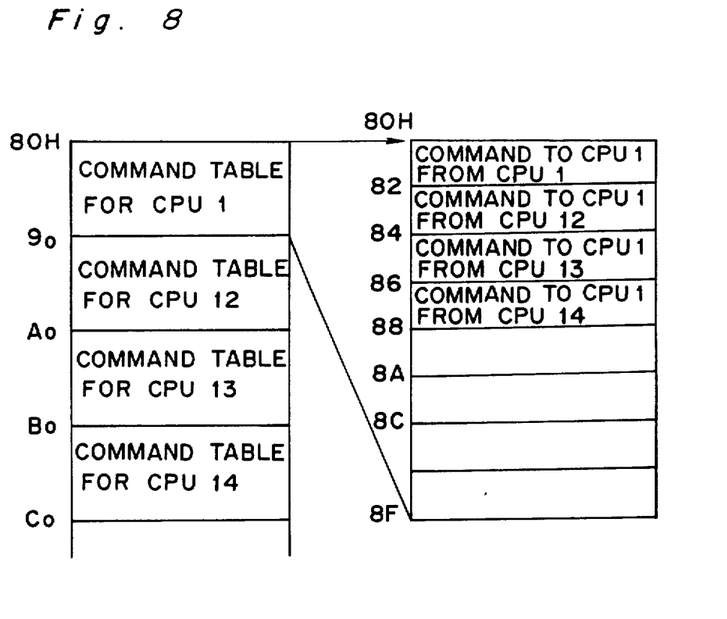
FIG. 8 is a detailed layout of a command table in the RAM.

Referring to FIG. 8, addresses 80H to C0H of RAM 16 are alotted for the command table 22 so as to store commands. The command table is divided into four writing sections: 80H-8FH for writing commands directed to CPU 1; 90H-9FH for writing commands directed to CPU 12; A0H-AFH for writing commands directed to CPU 13; and B0H-BFH for writing commands directed to CPU 14. Within the first section, addresses 80H and 81H are provided for writing a command from CPU 1 to CPU 1 (self-commanding); addresses 82H and 83H are provided for writing a command from CPU 12 to CPU 1; addresses 84H and 85H are provided for writing a command from CPU 13 to CPU 1; and 86H and 87H are provided for writing a commands from CPU 14 to CPU 1. Other sections are divided in a similar manner.

For example, in the case where CPU 12 has a command to CPU 1, CPU 12 writes a command (step #2) in addresses 82H and 83H and, then, it writes a dummy signal (step #3) in the interruption generation table allotted for CPU 1, during when CPU 12 has an access to RAM 16.

Figure 9:
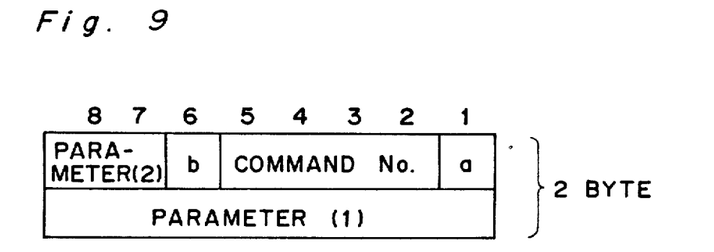
FIG. 9 is a detailed layout of a command as stored in the command table.

Referring to FIG. 9, there is shown one example of a format of a command which is defined by two bytes, e.g., addresses 82H and 83H. The 1st bit of the address 82H is a request flag a. When the request flag a=1, it indicates that a command is newly written by, in this case, CPU 12, and when the request flag a=0, it indicates that the command has been read by, in this case CPU 1.

Four bits from the second to fifth bits of the address 82H are provided for depositing a command number expressing one of 16 different kinds of commands, such as a command to operate the printer, ect. The 6th bit of the address 82H is an answer flag b, corresponding to a request command. When b=0, it is indicated that the command is a request command, and when b=1, it is indicated that the command is an answer command.

The operation of the registration data transmission (RDT) system is described below in connection with FIG. 9 with an assumption that CPU 12 has a data which should be transferred to CPU 1.

Figure 10:
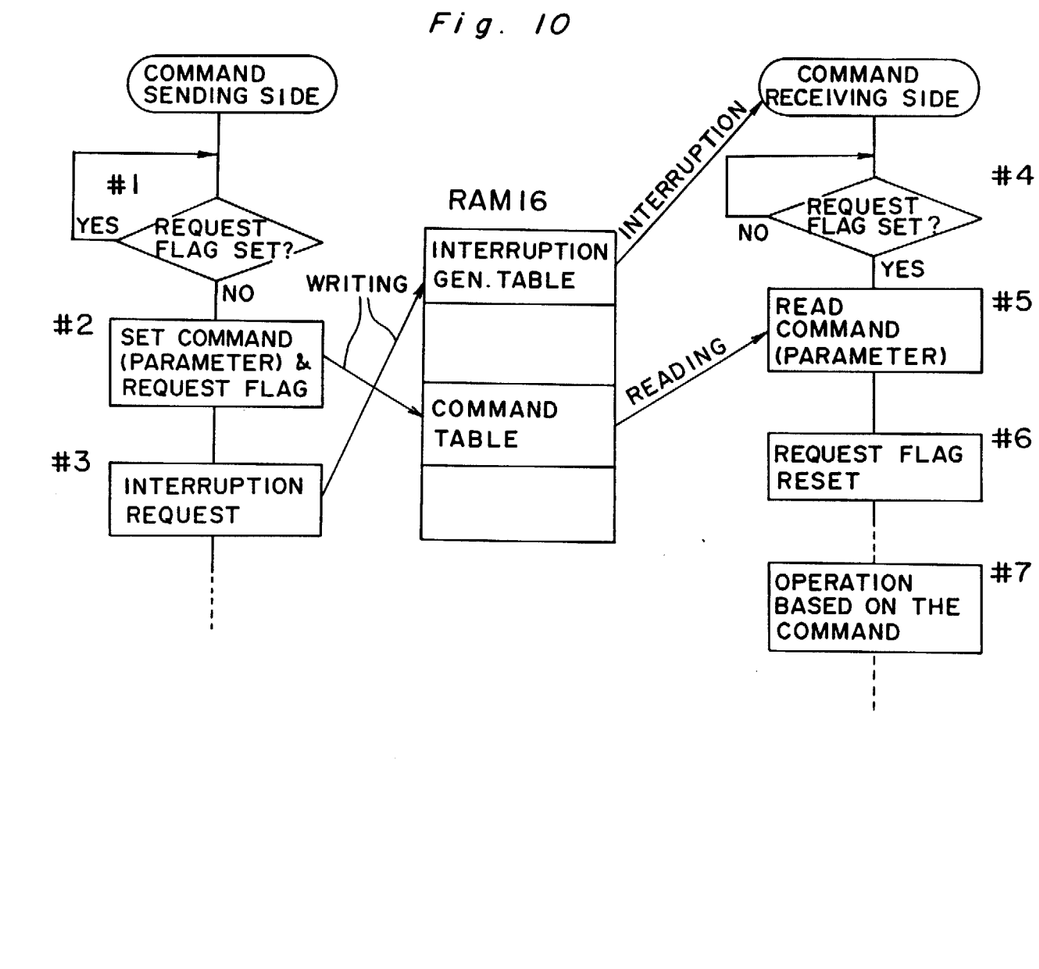
FIG. 10 is a flow chart showing an operation to send a command from one CPU to another CPU through the RAM.

Referring to FIG. 10, steps #1–#3 are carried out in CPU 12 during the timing clock TC2, and steps #4–#7 are carried out in CPU 1 during the timing clock TC1 of the later occurrence.

At step #1, it is detected whether the request flag a in address 82H in RAM 16 is set, or not. If the request flag a is set, it means that CPU 1 has not yet read the command written in the previous cycle of operation in addresses 82H and 83H. In this case, step #1 is repeated again and again until CPU 1 reads the command given to CPU 1 from CPU 12 in the previous cycle of operation. When CPU 1 reads the previous command, it resets the request flag a indicating that a new command can be over-written in addresses 82H and 83H. When CPU 12 detects the reset of the request flag in address 82H, it now writes a new command to CPU 1 in addresses 82H and 83H and, at the same time set the request flag a in address 82H. In FIG. 10, a line extending from a box of step #2 to RAM indicates the writing operation of the command in addresses 82H and 83H. Then, at step #3, an interrution request, such as a dummy signal, is written in a certain area in the interruption generation table so as to indicate that CPU 1 should take an interruption to receive data from CPU 12.

Based on the interruption request written in RAM 16 as carried out at step #3, interruption signal generator 17, which is defined by a decoder, generates an interruption signal to CPU 1. CPU 1 immediately detects the interruption signal, but it continues to carry out its main routine operation. Also, upon detection of the interruption signal, CPU 1 watches for the generation of the next timing clock pulse TC1. When the next timing clock pulse TC1 is detected an interruption to the main routine is effected so as to carry out steps #4 to #7. At step #4, CPU 1 reads addresses 82H and 83H and finds that the request flag a is set, indicating that there is a new command sent from CPU 12 to CPU 1. Then, at step #5, CPU 1 reads the command stored in addresses 82H and 83H. Then, at step #6, the request flag in address 82H is reset so as to make it ready to receive a next command from CPU 12. Thereafter, at step #7, an operation according to the command is carried out. The operation may be very simple that it can be done in CPU 1 without any further data from CPU 12, or the operation may be very large, such as a transmission of word processor data from CPU 12 to CPU 1. In such a case, the amount of data to be transmitted is very large and, therefore, high speed buffers 31 and 32 are activated to effect the direct data transfer from CPU 12 to CPU 1 without passing through RAM 16.

If there is no interruption signal stored in the interruption generation table, or if there is no data which must be transferred to another CPU, the CPU in RDT system does not take an access to RAM 16 even when the timing clock pulse for that CPU is present, so that that CPU can save time to effectively carry out its own job. In other words, a CPU in RDT system takes an access to RAM 16 during the presence of the particular timing clock under the condition that the CPU has data which must be transferred to another CPU, or that the CPU detects an interruption signal as caused by another CPU.

D. Conditions to combine two data transmission systems

According to the SDT system, the data transmission between the host CPU and the slave CPUs is carried out sequentially taking turns. For the data transmission with one slave CPU, the host CPU must take a number of, such as four in the above given example, interruptions.

According to the RDT system, the data transmission between the CPUs is carried out by the use of the externally provided RAM in which the data to be transferred is temporarily registered. Each CPU has an access to the RAM only during the pulse duration of a timing clock assigned to the CPU. Since the SDT system requires a number of interruptions, the data transmission under the RDT system will not be properly carried out while the SDT system is carried out.

Figure 4A:
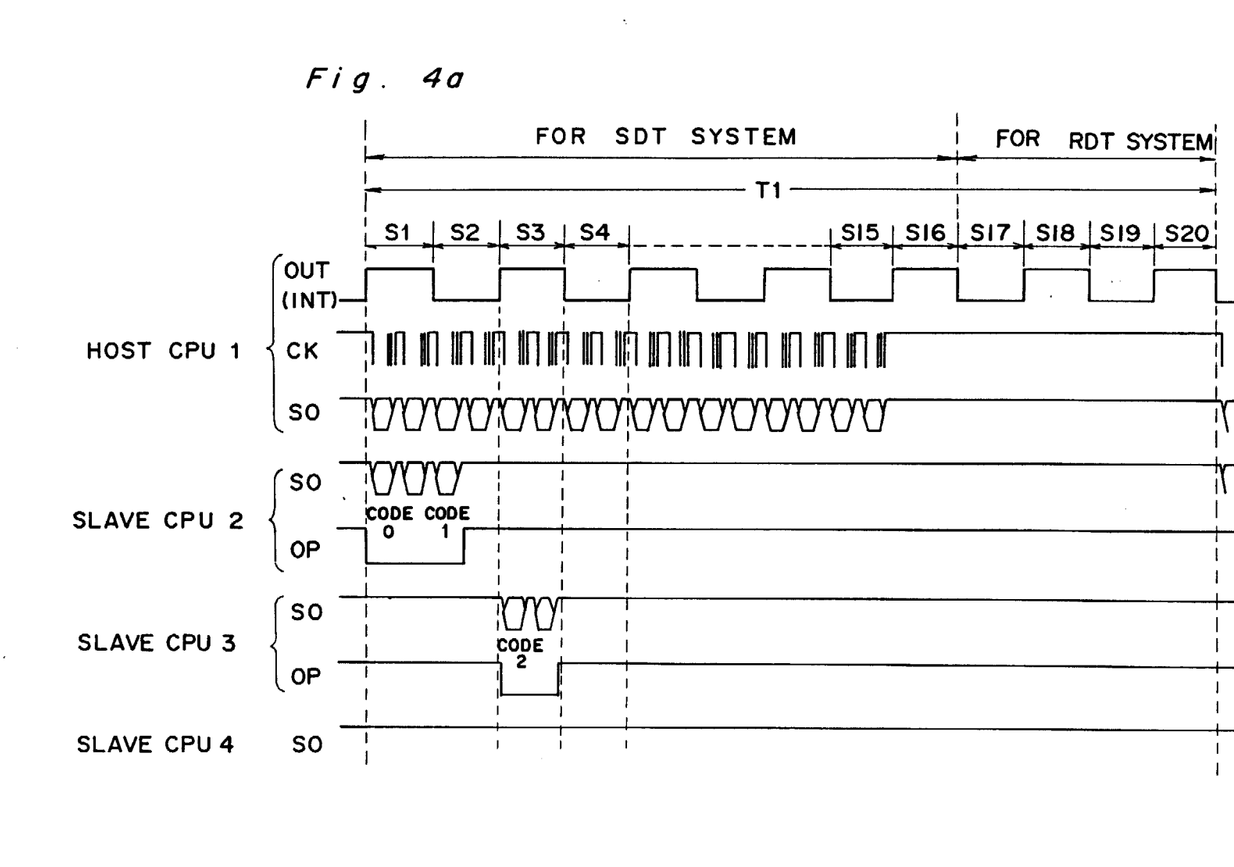
FIG. 4a is a graph showing waveforms of signals produced from the host CPU and slave CPUs.
Figure 4B:
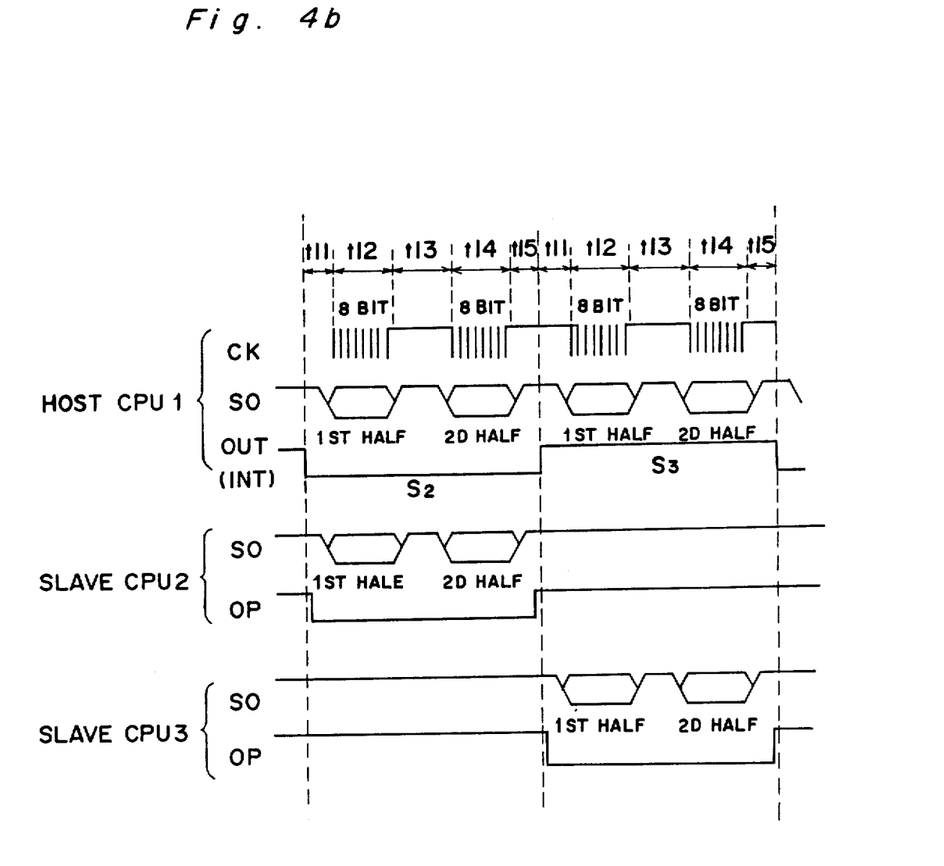
FIG. 4b is a graph showing the details in the time slots S3 and S4.

According to the present invention, as indicated in FIG. 4a, the data transmission under the SDT system is carried out in time slots S1-S16, and the data transmission under the RDT system is carried out in one of time slots S17-S20, for example, time slot S17 in the embodiment described herein. To this end, it is necessary to complete one cycle operation of data transmission under the RDT system within one time slot period. To meet this requirement, it is necessary to cover one complete timing clock pulse TC1 (FIG. 5) in time slot S17.

The one cycle operation period for the data transmission under the RDT system includes a waiting period T2 in which the CPU, e.g., 1, waits until its turn to have an access to RAM 16, and an access period t2 in which the CPU has an access to RAM. The access period t2 is equal to the pulse duration of timing clock pulse TC1.

Figure 5:
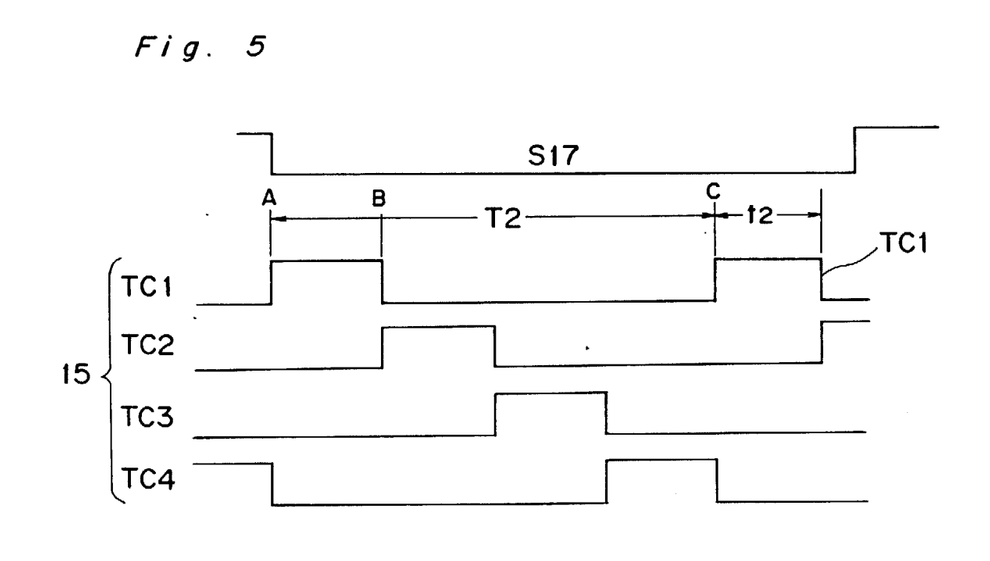
FIG. 5 is a graph showing waveforms of timing clock pulses used in the RDT system.

Since the operation under SDT system and that under RDT system are carried out with no synchronization, the waiting period T2 varies depending on the timing when the time slot s17 starts. In FIG. 5, the maximum of the waiting period T2 is shownn, in which the time slot S17 starts immediately after the time A at which the timing clock pulse TC1 steps up. In this case, since the step up of the timing clock pulse TC1 at time A can not be detected during the time slot S17, CPU 1 must wait until the next step up of the timing clock pulse TC1, which is at time C, so as to have an access to RAM 16. The maximum of the access time is t2. Therefore, it is necessary to make each time slot greater than one cycle operation period for the data transmission under the RDT system, and this can be expressed as follows.

$$T1/20 > T2 + t2 \tag{1}$$

In each of time slots S1-S16, five interruptions are effected at the start of each period t11, t12, t13, t14 and t15 so as to serially transmit two 8-bit data. Since, $$t11 + t12 + t13 + t14 + t15 = T1/20, \tag{2}$$

the following relationship is obtained.

$$tli < T1/20 \text{ (wherein } i = 1, 2, 3, 4 \text{ or } 5) \tag{3}$$

From the equations (1) and (2), it is understood that the following relationship $$tli > T2/t2 \text{ (wherein } i = 1, 2, 3, 4 \text{ or } 5) \tag{4}$$

is not always true. Therefore, it is understood that the one cycle operation period for the RDT system can not be inserted in the time slots S1-S16 in which the data transmission by the SDT system is being carried out. However, since no interruption for the SDT system is effected in any one of the time slots S17-S20, the data transmission under the RDT system can be effected during these time slots S17-S20. Also, if there is any data which should be communicated from SDT system to RDT system, such a data is temporarily stored in the common CPU, e.g. CPU 1 in the above embodiment, during time slots S1-S16 in which the data transmission under the SDT system is carried out, and then, the data is transferred to the RDT system during time slots S17-S20. The data communication in the opposite direction, i.e., from RDT system to SDT system can be carried out in a similar manner.

E. Operation of the data communication system

Referring to FIGS. 11-14, flow charts are shown for the operation in the common CPU 1. According to the embodiment discussed herein, the data transmission under the RDT system is carried out during the time slot S17. The timer and the flags used in the flow charts are listed below.

Timer 1: A timer for counting time slots to make INT signal.

Timer 2: A timer for counting time t11 and t13 to provide interval before effecting the 8-bit serial data transmission.

Flag 1: A flag which becomes "1" when the procedure enters the time slot S17.

Flag 2: A flag which becomes "1" when the first half of the serial data is sent, and "0" when the second half of the serial data is sent.

Slot No.: A number representing the time slot from S1 to S20.

Figure 11:
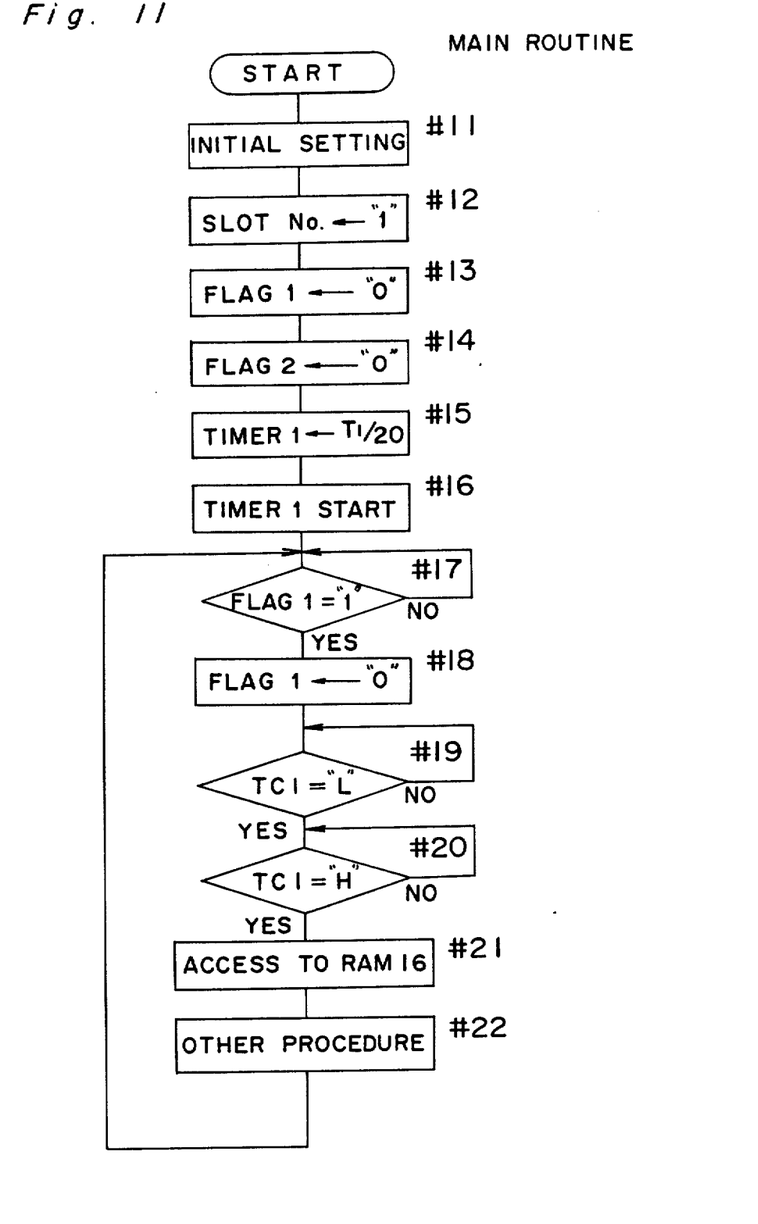
FIG. 11 is a flow chart showing a main routine operation of the host CPU.

Referring to FIG. 11, steps #11-#16 are shown for the main routine. At step #11, the initial setting is effected, and at step #12, slot number is reset to No. 1. Then, flags 1 and 2 are reset to carry "0" (steps #13 and #14). Then, at step #15, a time T1/20 is set in timer T1 and timer T1 starts to count T1/20 at step #16.

The procedure through steps #17-#22 enters only when flag 1 is detected as carrying "1". Here, flag 1 carries "1" at step #34 in an interruption procedure I shown in FIG. 12, that is when the operation enters time slot S17. In other words, before the operation enters time slot S17, the procedure through steps #17-#22 will not be carried.

When the program passes through step #17, flag 1 carries "0" at step #18. Then, at steps #19 and #20, the leading edge of the timing clock pulse TC1 is detected. When the timing clock pulse TC1 is detected, the program goes to step #21 at which access to RAM 16 by CPU 1 is enabled. Then, at step #22, other procedure, such as calculation, is carried out. Thereafter, the program returns back to step #17.

Figure 12:
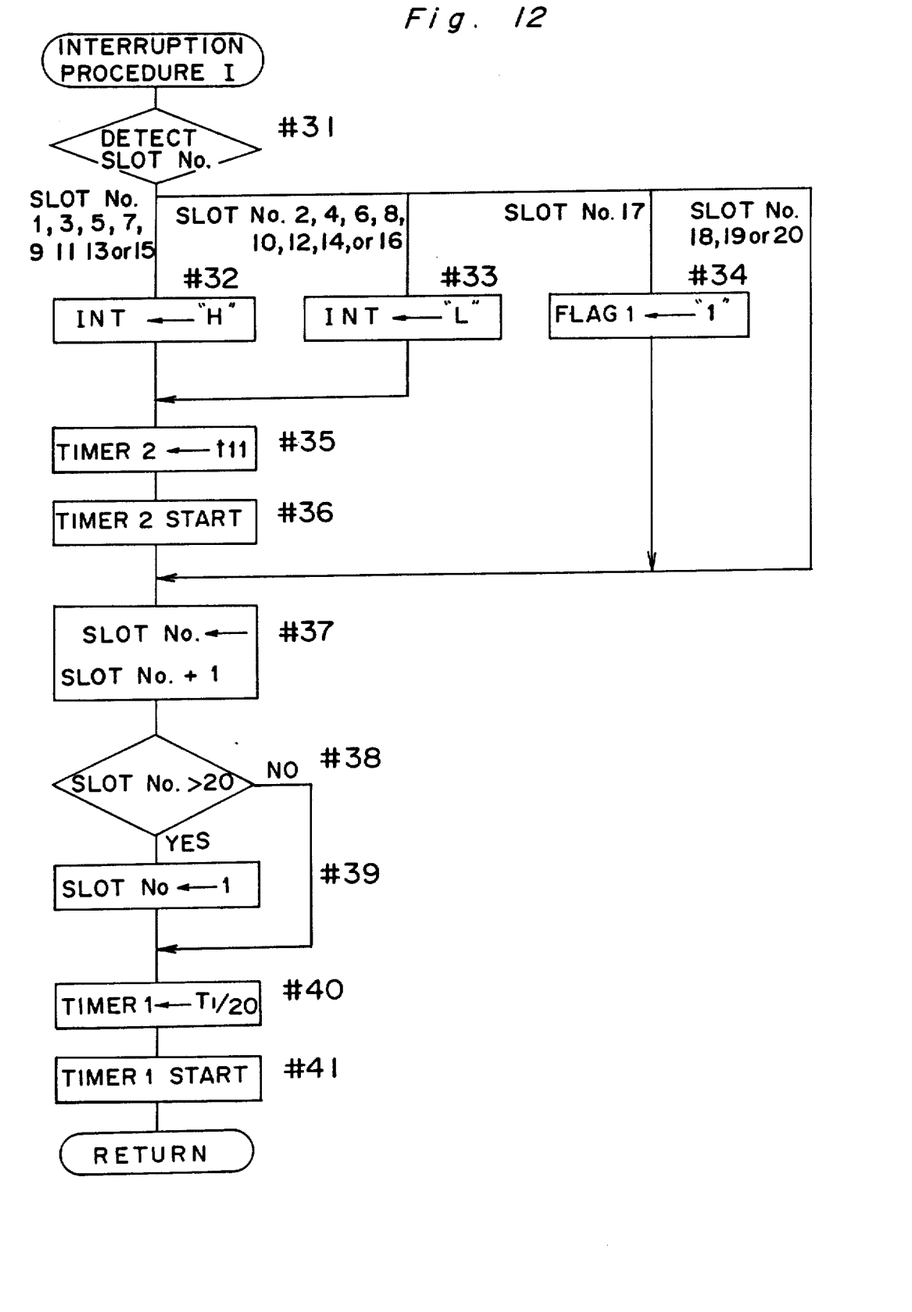
FIG. 12 is a flow chart showing an operation to make time slots and to separate a time slot No. 17 for the data transmission under the RDT system.

Referring to FIG. 12, an interruption procedure I is shown, which is initiated when timer 1 completes counting one time slot. At step #31, the time slot number is detected. When the slot number is 1, 3, 5, 7, 9, 11, 13 or 15, the program goes to step #32 to produce a HIGH level signal for the INT signal (FIG. 4a). When the slot number is 2, 4, 6, 8, 10, 12, 14 or 16, the program goes to step #33 to produce a LOW level signal for the INT signal. After steps #32 or #33, the program goes to step #35 at which time t11 is set in timer 2, which is started at step #36. Then, the program goes to step #37.

When the slot number is 17, the program goes to step #34 to set "1" in flag 1 indicating that the procedure has entered the time slot S17. Then, the program goes to step #37 without activating timer 2. When the slot number is 18, 19 to 20, the program jumps to step #73.

As apparent from the above, the program follows step #32 or #33 when the data is transmitted under the sequence data transmission (SDT) system, and it follows step #34 when the data is transmitted under the registration data transmission (RDT) system. It is possible to have the steps to make INT signal HIGH or LOW even after the detection of slot numbers 17, 18, 90 and 20.

At step #37, the slot number is increased by added "1", and at step #38, it is detected whether or not the slot number is less than the last slot number, i.e., twenty. If the slot number is not the last slot number, the program goes to step #40, but if it is the last slot number, the program goes to step #39 to change the slot number from "20" to "1". Then, the program follows steps #40 and #41 so as to start counting the next time slot.

Figure 13:
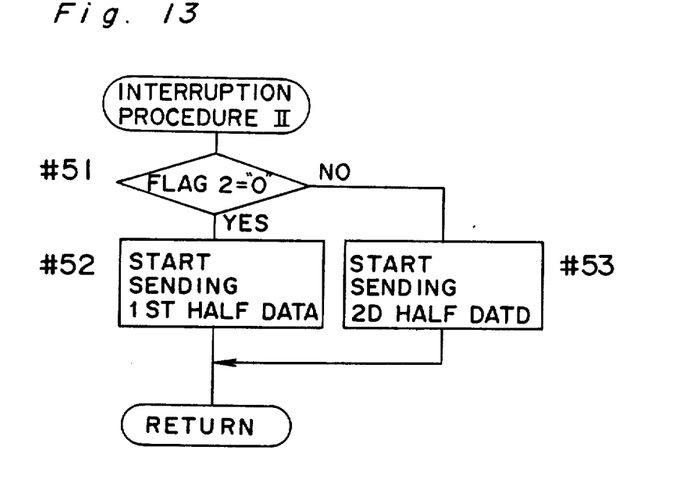
FIG. 13 is a flow chart showing an operation to start sending the first and second half data under the SDT system.

Referring to FIG. 13, an interruption procedure II is shown, which is initiated when timer 2 completes counting a time t11 or t13. At step #51, it is detected whether or not flag 2 is carrying "0". If flag 2 is carrying "0" indicating that the second half data has been sent in the previous procedure, the program goes to step #52 to start sending the first half data through the SDT system, but if it is carrying "1", the program goes to step #53 to start sending the second half data through the SDT system. It is to be noted that the data transmitted in these steps #52 and #53 is from CPU 1 to CPU 2, 3 or 4, and may include data from the RDT system.

Figure 14:
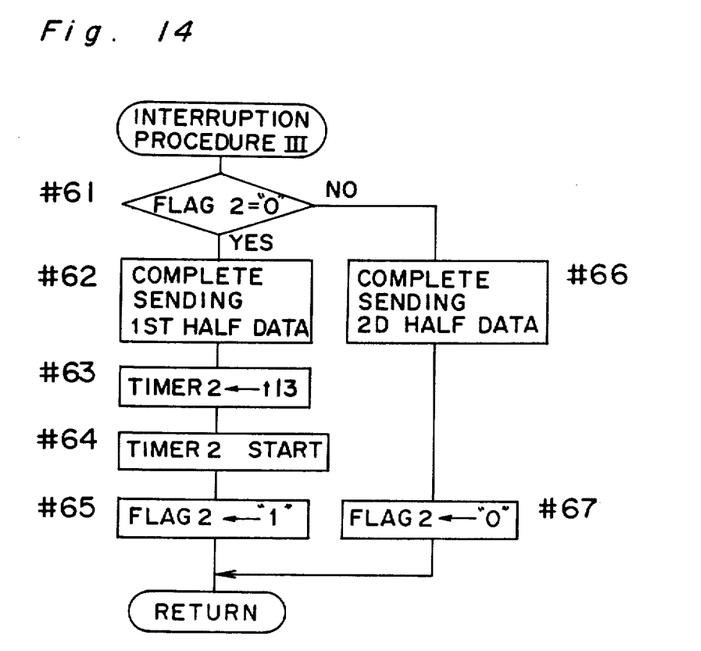
FIG. 14 is a flow chart showing an operation to complete sending the first and second half data under the SDT system.

Referring to FIG. 14, an interruption procedure II is shown, which is initiated when the 8-bit data has been sent in the time interval t12 or t14. At step #61, it is detected whether or not flag 2 is carrying "0" or not. If it is carrying "0" indicating that the second half data has been sent in the previous procedure, the program goes to step #62 to complete sending the first half data through the SDT system, but if it is carrying "1", the program goes to step #66 to complete sending the second half data through the SDT system. At steps #63 and #64, timer 2 starts to count time t13, and at step #65, "1" is set in flag 2 to indicate that the sending of the first half data has been completed. Similarly, at step #67, "0" is set in flag 2 to indicate that the sending of the second half data has been completed.

As apparent from the foregoing description, interruption procedure I starts at the leading edge of each time slot, interruption procedure II starts at the ends of time intervals t11 and t13, and interruption procedure III starts at the at the ends of time intervals t12 and t14.

As has been described above, according to the present invention, the two different data transmission systems SDT and RDT can mutually communicate with each other in a time sharing manner using a common CPU which originally belongs to SDT system or RDT system.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A data communication system for communicating data between two different data transmission systems comprising:
    a first data transmission system (SDT) for the data transmission between a host CPU and a plurality of slave CPUs comprising:
        said host CPU having an output terminal means for repeatedly producing first data in a predetermined sequence of time slots and at least one slave CPU interruption in each time slot;
        a bus structure having at least one first-type of line extending from said output terminal means of said host CPU for transmitting said data; and
        said plurality of slave CPUs, each having an input terminal means connected to said first-type line of said bus structure for receiving said first data;
    a second data transmission system (RDT) for the data transmission between said host and at least one of a group of second CPUs comprising:
        memory means for storing a command table and an interruption table, said command table including a storage location for a first command, said first command comprising a command to said second CPU;
        said host CPU connected to said memory means to write said first command into said storage location in said memory means and to subsequently write a first code to a location in said interrupt table, said first command writing and said first code writing taking place at a first predetermined pulse period of a predetermined sequence of pulses;
        decoder means connected to said memory means and responsive to the writing of said first code to generate a first interruption signal to said second CPU; and said second CPU being responsive to said first interruption signal to read said first command from said memory means at a second predetermined pulse period;

wherein said sequence of time slots have at least one time slot the length of which includes at least the sum of one cycle of said predetermined sequence of pulses and one pulse period for carrying out the data transmission by said second data transmission system.

2. A data communication system as claimed in claim 1,
  wherein said host CPU further has an input terminal means for receiving second data;
  wherein said bus structure further has at least one second-type of line extending from said input terminal means of said host CPU for receiving said second data; and
  wherein at least one of said slave CPU further has an output terminal means connected to said second-type line of said bus structure for sending said second data from said slave CPU.

* * * * *

UNITED STATES PATENT AND TRADEMARK OFFICE
CERTIFICATE OF CORRECTION

PATENT NO. : 4,750,115
DATED : June 7, 1988
INVENTOR(S) : Makoto Sekiya et al.

It is certified that error appears in the above—identified patent and that said Letters Patent is hereby corrected as shown below:

On the cover page, [22] Filed: delete "Oct. 20, 1986" and insert --Oct. 2, 1986--.

Signed and Sealed this

First Day of November, 1988

Attest:

DONALD J. QUIGG

*Attesting Officer*   *Commissioner of Patents and Trademarks*